United States Patent [19]

Araki et al.

[11] Patent Number: 5,204,407
[45] Date of Patent: Apr. 20, 1993

[54] PNEUMATIC TIRES

[75] Inventors: Mitsuru Araki, Hachioji; Yoshiyuki Morimoto, Kodaira, both of Japan

[73] Assignee: Bridgestone Corporation, Tokyo, Japan

[21] Appl. No.: 712,815

[22] Filed: Jun. 10, 1991

[30] Foreign Application Priority Data

Jun. 11, 1990 [JP] Japan .................................. 2-149830
Jun. 11, 1990 [JP] Japan .................................. 2-149831

[51] Int. Cl.$^5$ ....................... C08F 4/08; C08F 297/04; C08L 9/00; C08L 53/02
[52] U.S. Cl. ..................................... 525/99; 525/271; 525/272
[58] Field of Search ....................... 525/99; 152/209 R

[56] References Cited

U.S. PATENT DOCUMENTS 4,526,934  7/1985  Oshima et al. ................... 525/99

Primary Examiner—Jacob Ziegler
Attorney, Agent, or Firm—Sughrue, Mion, Zinn, Macpeak & Seas

[57] ABSTRACT

A pneumatic tire has a tread with a rubber composition produced by blending a rubber component with a styrene based thermoplastic elastomer. The rubber component is composed mainly of a diene based rubber, and the elastomer is so preliminarily internally crosslinked that tensile stress at a 100% elongation is increased to 10 to 1,000% of that of the styrene based thermoplastic elastomer not internally crosslinked. A pneumatic tire is also disclosed, having a tread portion with a rubber composition blended with a vinyl aromatic hydrocarbon thermoplastic elastomer in an amount of 5-80 parts by weight relative to 100 parts by weight of the rubber component. The vinyl aromatic hydrocarbon thermoplastic elastomer satisfying the following requirements: (1) the elastomer is a vinyl aromatic hydrocarbon-conjugated diene based block type thermoplastic elastomer; (2) the elastomer has a weight ratio between a vinyl aromatic hydrocarbon and a conjugated diene as constituent monomer units thereof being 40/60 to 95/5; (3) a content percentage of the vinyl aromatic hydrocarbon in vinyl aromatic hydrocarbon based segments in the elastomer is not less than 50% by weight; and (4) a weight average molecular weight of the elastomer is not less than $1 \times 10^5$.

11 Claims, No Drawings

PNEUMATIC TIRES

BACKGROUND OF THE INVENTION (1) Field of the Invention:

The present invention relates to pneumatic tires. More particularly, the invention relates to pneumatic tires which greatly improve driving performance, braking performance and cornering stability on ice and snow roads without deteriorating cornering stability, durability and wear resistance in the summer.

(2) Related Art Statement:

In order to assure driving performance, braking performance and cornering stability on roads with on ice and snow formerly, spike tires in which spike pins are piled into a surface portion of a tread have frequently been used. However, such tires pose grave social problems because dust is produced due to wearing of the spike pins themselves and wearing or damages of the roads. To cope with this, a projecting amount of the spike pin and the number of spike pins per unit area have been controlled and the material of the spike pins has been examined. However, no fundamental solution of such social problems has been realized.

On the other hand, studless tires exhibiting driving performance, braking performance and cornering stability on roads with ice and snow without using spikes or chains have been recently examined and rapidly widely used, but it cannot necessarily be said that performances on road with ice and snow is exhibited as compared with the spike tires.

With respect to the rubber for the studless tires, a rubber composition using a polymer having a low glass transition point is used to ensure elasticity of the rubber at low temperature. However, depending upon a hysteresis characteristic of such a polymer, it remains a problem in that although the tire performance is exhibited to some extent in an ice and snow temperature range, braking performance and cornering stability are not sufficient on wet roads or dry roads.

Further, as disclosed in Japanese patent application Laid-open Nos. 55-135,149, 58-199,203 and 60-137,945, it is known that when a rubber composition compounded with a large amount of a softener or a plasticizer is used as a tread rubber, the performance at low temperatures is similarly improved. However, these techniques have serious problems in that although the rate at which the performance on ice and snow roads is improved, reduction in wear resistance and separation of the tread rubber occur during running on general roads.

Although each of the above techniques affords excellent performance on roads with ice and snow in a relatively low temperature range (a so-called dry-on-ice state of) not more than $-5°$ C., a sufficient coefficient of friction cannot be obtained on ice and snow in a wet state (a so-called wet-on-ice state) near $0°$ C. Therefore, it cannot be said that driving performance, braking performance and cornering stability are improved over the entire range.

SUMMARY OF THE INVENTION

It is an object of the present invention to provide pneumatic tires having improved driving performance, braking performance and cornering stability on roads with ice and snow without deteriorating cornering stability and durability in the summer season. Particularly, the invention provides pneumatic tires which have improved driving performance performance, braking performance and cornering stability on road with ice and snow in the above-mentioned wet state without deteriorating wear resistance.

The present inventors discovered that when a styrene based thermoplastic elastomer having an internal crosslinked structure preliminarily formed is incorporated into a rubber of a tread, the elastomer forms domains without being fused and flown, so that the coefficient of friction on ice and snow of the rubber of the tread is increased. The inventors further confirmed that since the styrene based thermoplastic elastomer is co-crosslinked with the rubber as a matrix, wear resistance of the rubber composition of the tread is equally maintained irrespective of the presence or absence of the thermoplastic elastomer. A first aspect of the present invention has been accomplished based on the discovery and the confirmation mentioned above.

That is, the pneumatic tire according to the present invention is characterized in that a rubber composition is used for the tread, the rubber composition in which a rubber component composed mainly of a diene based rubber is compounded with the styrene based thermoplastic elastomer internally crosslinked such that tensile stress at the time of 100% elongation is increased by a range of 10 to 1,000% of that of the elastomer not internally crosslinked.

As the internally crosslinked styrene based thermoplastic elastomer to be used in the present invention, any of variously crosslinked types, such as a sulfur-crosslinked type, a peroxide-crosslinked type, and a radiation crosslinked type, which are formerly employed for the styrene based thermoplastic elastomers, may be used. The internally crosslinked styrene based thermoplastic elastomer is not particularly limited to a specific crosslinking way or a specific crosslinked structure.

The styrene based thermoplastic elastomer to be crosslinked contains at least one, preferably one or two, non-rubbery polymer block segment each consisting mainly of styrene, (hereinafter referred to as "polystyrene block") and at least one rubbery polymer block segment (hereinafter referred to as "rubber block"). Such a styrene based thermoplastic elastomer has, for example, a structure that polystyrene blocks exist at opposite ends and a rubber block is located at an intermediate portion, a structure that a polystyrene block and a rubber block are located on opposite sides, a structure that at least three polystyrene end portions are connected together by a rubber block, or a structure that polystyrene blocks and rubber blocks are alternately introduced into each of the above structures. As the rubber block, a polyolefin based elastomer block such as polybutadiene block or a polyisoprene block may be used. However, the present invention is not limited to a specific one. Among them, a styrene-butadiene-styrene (S-B-S) type block copolymer elastomer or a styrene-butadiene (S-B) type block copolymer elastomer obtained with a catalyst of an organic lithium compound is preferred.

Processes for producing these styrene based thermoplastic elastomer are well known. For example, Japanese patent application Laid-open No. 60-243,109 and Japanese patent publication No. 48-2,423 describe the production of S-B-S type block copolymer elastomers with organic Li compounds as catalysts, and Japanese patent publication No. 36-19286 describes the production of S-B type block copolymer elastomers or S-B-S type block copolymer elastomers with similar catalysts.

The styrene based thermoplastic elastomer needs to be internally crosslinked to such an extent that the tensile stress at the elongation of 100% as measured by ASTM D 638 is increased in a range of 10 to 1,000% by the internal crosslinking. When the styrene based thermoplastic elastomer is internally crosslinked to satisfy the tensile stress increased in this range of 10 to 1,000%, the internally crosslinked styrene based thermoplastic elastomer as incorporated into the tread rubber can be dispersed, in the matrix, in the form of particles having the average domain diameter of not less than 1 $\mu$m. If this average domain diameter of the particles is less than 1 $\mu$m, the above performances of the tire on ice and snow are insufficient. However, when the internal crosslinking reaction is excessively effected, the average domain diameter exceeds 1,000 $\mu$m, so that wear resistance of the tread is unfavorably deteriorated.

The internally crosslinked styrene based thermoplastic elastomer is preferably blended into the rubber component in an amount of 1–50 parts by weight, more preferably 5–40 parts by weight relative to 100 parts by weight of the rubber component. If not more than 1 part by weight of the styrene based thermoplastic elastomer is compounded, effects of improving the driving performance, braking performance and cornering stability on roads with ice and snow road are small. On the other hand, if more than 50 wt% of the cross-linked styrene based thermoplastic elastomer is blended, the kneading efficiency of the rubber composition is deteriorated.

A main portion of the rubber component may be composed of natural rubber, polyisoprene rubber, polybutadiene rubber, styrene-butadiene copolymer rubber, styrene-isoprene-butadiene terpolymer rubber, styrene-isoprene copolymer rubber, isoprene-butadiene copolymer rubber, etc. The main portion of the rubber composition means that at least one kind of these rubbers occupies 50 to 100% by weight of the entire rubber component.

Besides the diene based rubber and the internally crosslinked styrene based thermoplastic elastomer, other rubber, and a compounding agent ordinarily used in the tread rubber may be incorporated into the rubber composition for the tread of the pneumatic tire according to the present invention. The compounding agent may include filler, antioxidant, vulcanizer, vulcanization accelerator, etc. The kinds and amounts of other rubber and the compounding agents are selected to fall in ordinarily employed ranges, and not particularly limited.

The present inventors have further repeatedly and strenuously investigated performance on ice and snow, particularly, performance on ice and snow in the wet state, with respect to all season type tread rubbers of the above-mentioned type, and confirmed that when a thermoplastic elastomer having a specific structure is incorporated into the tread, the performance on ice and snow can be greatly improved without deteriorating cornering stability, durability and wear resistance required for tires to be used in the summer season, although reasons are not clear. A second aspect of the present invention has been accomplished based on the above investigation and confirmation.

That is, the second aspect of the present invention is to provide a pneumatic tire with a tread, characterized in that the tread employs rubber composition into which a vinyl aromatic hydrocarbon based thermoplastic elastomer is incorporated in an amount of 5 to 80 parts by weight relative to 100 parts by weight of a rubber component, and the vinyl aromatic hydrocarbon based thermoplastic elastomer satisfies requirements that (1) the elastomer is a vinyl aromatic hydrocarbon-conjugated diene based block type thermoplastic elastomer;

(2) a ratio in weight between a vinyl aromatic hydrocarbon and a conjugated diene as constituting units of the elastomer is 40/60 to 95/5;

(3) a content of the vinyl aromatic hydrocarbon in vinyl aromatic hydrocarbon based segments of the elastomer is not less than 50% by weight; and (4) a weight average molecular weight of the elastomer is not less than $1.0 \times 10^5$.

The vinyl aromatic hydrocarbon based thermoplastic elastomer to be used in the pneumatic tire according to the present invention is not particularly limited to any specific kind of thermoplastic elastomer, so long as the above requirements are satisfied. Various kinds of elastomers can be obtained by changing units of the vinyl aromatic hydrocarbon and the conjugated diene and the elastomer may include linear block copolymers and radial block copolymer defined below.

That is, the linear block copolymers have general formula:

(1) $(A-B)_n$, (2) $A+B-A)_n$ or (3) $B+A-B)_{n+1}$ in which A and B are a copolymer block composed mainly of a vinyl aromatic hydrocarbon and a polymer block composed mainly of a conjugated diene, respectively, and n is an integer of one or more, and generally an integer of 1–5. In these formulae, no clear boundary may be seen between the polymer blocks A and B. The radial block copolymers have general formula:

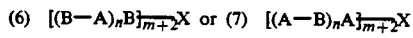

in which, A and B have the same meanings as given above, X is a residual group of a coupling agent such as silicon tetrachloride, tin tetrachloride, epoxidized soybean oil or an ester of a carboxylic acid or a residual group of an initiating agent such as a polyfunctional organic lithium compound, and m and n are integer of not less than 1, and usually an integer of 1–5.

Each of these block copolymers is obtained by effecting polymerization in a solvent of a hydrocarbon by using an organic lithium compound as an initiator.

As the hydrocarbon solvent, an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as benzene, toluene, ethylbenzene or xylene may be used. The organic lithium compound is an organic lithium compound in which at least one lithium atom is combined per one molecule. For example, ethyllithium, n-propyllithium, isopropyllithium, n-butyllithium, sec-butyllithium, tert-butyllithium, hexamethylene dilithium, butadienyl dilithium, and isoprenyl dilithium may be recited.

As the vinyl aromatic hydrocarbon, styrene, o-methylstyrene, p-methyl,styrene, p-tert-butylstyrene, 1,3- dimethylstyrene, α-methylstyrene, vinylnaphthalene, and vinylanthracene may be recited. Particularly, styrene may be recited as a most popular one. These hydrocarbons may be used singly or in a mixed state of two or more kinds. The conjugated diene is a diolefin having a pair of conjugated double bonds. For example, 1,3-butadiene, 2-methyl-1,3-butadiene(isoprene), 2,3-dimethyl-1,3-butadiene, 1,3-pentadiene, and 1,3-hexadiene may be recited. Particularly, 1,3-butadiene and isoprene may be recited as most popular ones. These conjugated dienes may be used singly or in a mixed state of two or more.

In order to control the percentage of the vinyl aromatic component in the vinyl aromatic segments contained in the vinyl aromatic hydrocarbon in the production of the block copolymer, (i) a method for polymerizing a mixture of the vinyl aromatic hydrocarbon and the conjugated diene, which is continuously fed into a polymerization system and/or (ii) a method for effecting copolymerization between the vinyl aromatic hydrocarbon and the conjugated diene by using a polar compound or a randomizing agent can be used. As the polar compound or the randomizing agent, ethers such as tetrahydro-furan, diethylene glycol dimethyl ether and diethylene glycol dibutyl ether, amines such as triethylamine and tetramethylethylene diamine, thioethers, phosphines, phosphoamides, and alkylbenzene sulfonates, and alkoxides of potassium or sodium.

The weight average molecular weight of the vinyl aromatic hydrocarbon based thermoplastic elastomer is controlled by varying the amount of the organic lithium compound used as the initiator.

As the process for producing such a thermo-plastic elastomer, those described in Japanese patent application Laid-open No. 60-243,109, Japanese patent publication Nos. 36-19,286, 43-17,979, 48-2,423, 57-49,567 and 58-11,446 may be recited.

The vinyl aromatic hydrocarbon based thermoplastic elastomers satisfying the requirements and adapted to be used for the tread of the pneumatic tire according to the present invention may be produced by one of the above-mentioned processes.

In the present invention, if the weight ratio between the vinyl aromatic hydrocarbon and the conjugated diene of the above thermoplastic elastomer to be incorporated into the rubber composition is less than 40/60, the effect of improving the performances on ice and snow cannot be fully exhibited, while if it is more than 95/5, not only the wear resistance of the rubber composition is deteriorated, but also the processability is greatly adversely affected. If the content of the vinyl aromatic hydrocarbon in the vinyl aromatic hydrocarbon based segment of the elastomer is less than 50% by weight, the performances on ice and snow cannot be fully exhibited. Further, if the weight average molecular weight of the elastomer is less than $1.0 \times 10^5$, not only the performances on ice and snow cannot be fully exhibited, but also the wear resistance is adversely affected.

In the present invention, the addition amount of the above thermoplastic elastomer incorporated into the rubber composition is 5-80 parts by weight relative to 100 parts by weight of the rubber forming the matrix. If the addition amount is less than 5 parts by weight, the performance on ice and snow cannot be fully exhibited. On the other hand, if it is more than 80 parts by weight, durability and wear resistance required in the summer season are greatly deteriorated, so that the effects aimed at by the present invention cannot be exhibited.

As the rubber component, diene based rubbers, that is, natural rubber, polyisoprene rubber, polybutadiene rubber, styrene-butadiene copolymer rubber, styrene-isoprene-butadiene terpolymer rubber, styrene-isoprene copolymer rubber, and isoprene-butadiene copolymer rubber may be favorably used singly or in a blended state. Particularly, the diene based rubber having a glass transition temperature Tg, of not more than $-30°$ C. is preferred.

The rubber composition arranged in the tread of the pneumatic tire according to the present invention may include other rubber or a compounding agent ordinarily used for the tread rubber, for example, a filler, an antioxidant, a vulcanizer, and a vulcanizer accelerator, besides the above diene based rubber and the vinyl aromatic hydrocarbon based thermoplastic elastomer. The kinds and the addition amounts of these additives are not limited to specific ranges, so long as they fall in the ranges ordinarily employed for the tread rubber.

These and other objects, features and advantages of the invention will be appreciated upon reading of the following description of the invention, with the understanding that some modifications, variations and changes of the same could be made by the skilled person in the art to which the invention pertains, without departing from the spirit of the invention or the scope of claims appended hereto.

DETAILED DESCRIPTION OF THE INVENTION

Now, the first aspect of the present invention will be explained below in more detail with reference to examples and comparative examples.

Properties of tread rubbers and tire performances of test tires were tested by the following methods.

(1) Average domain diameter of internally cross-linked styrene based thermoplastic elastomer in tread rubber:

Ten lot samples were selected among a test piece, and diameters of twenty domains in the internally cross-linked styrene based thermoplastic elastomer inside a visual view of an optical microscope were measured. The average domain diameter was calculated with respect to each of the lots, and then the average domain diameter was calculated with respect to the ten lots. The diameter of a domain was determined by measuring the maximum diameter and the minimum diameter thereof, and dividing the sum of these maximum and minimum diameters by 2.

(2) Coefficient of friction on ice:

The coefficient of friction of the rubber on ice, particularly that on ice near 0° C. in a wet state was measured by using a dynamic-static friction meter in the state that a surface of a sample (dimension: 10 mm in length, 10 mm in width, and 5 mm in thickness) was contacted with that of ice having a surface temperature of $-0.5°$ C. Measurement conditions were that a load was 2 kg/cm$^2$, a sliding speed was 10 mm/sec, an atmospheric temperature was $-2°$ C., and the surface state was made near a mirror surface.

(3) Braking performance on ice:

A passenger car radial tire PSR (165 SR 13) was prepared as a test tire, and subjected to ordinary running over 50 km as idling. Then, the tire was tested (The following wearing test was similarly effected). In the test, four test tires were fitted to a passenger car having a displacement of 1,500 cc, and a braked distance was measured on ice at an atmospheric temperature of −5° rays as shown in Table 1 to attain a sulfur crosslinking or radiative crosslinking structure.

TABLE 1

| Internally crosslinked styrene Based thermoplastic elastomer | A | B | C | D | E | F | G |
|---|---|---|---|---|---|---|---|
| Styrene based thermoplastic elastomer | | | | | | | |
| SBS*1 | 100 | 100 | 100 | — | 100 | 100 | 100 |
| SB*2 | — | — | — | 100 | — | — | — |
| Zinc oxide | 2 | 2 | 2 | 2 | — | — | — |
| Vulcanization accelerator CZ*3 | 1 | 1 | 1 | 1 | — | — | — |
| Stearic acid | 1 | 1 | 1 | 1 | — | — | — |
| Sulfur | 0.3 | 1.5 | 3 | 1.5 | — | — | — |
| Radiation dose (Mrad) | — | — | — | — | 5 | 50 | 400 |

(parts by weight)

*1 Styrene-butadiene-styrene block copolymer Trade name: Califlex 4122 manufactured by Shell Chemical Co., Ltd.
*2 Styrene-butadiene block copolymer Trade name: Asaflex manufactured by Asahi Chemical Industry Co., Ltd.
*3 CZ: N-cyclohexyl-2-benzothiazylsulfenamide C. Results were indicated by index by taking that of Comparative Example 1 as 100. The greater the value, the better the braking performance.

(4) Two test tires were fitted to a driving shaft of the passenger car having the displacement of 1,500 cc, and run on a concrete road of a test course at a given speed. Changes in depths of grooves were measured, and results were indicated by index by taking that of Comparative Example 1 as 100. The greater the value, the better the result.

EXAMPLES 1-5 AND COMPARATIVE EXAMPLES 1-4:

S-B-S type and S-B type styrene based thermoplastic elastomers were internally crosslinked at a compounding recipe or by an irradiating amount of radioactive rays as shown in Table 1 to attain a sulfur crosslinking or radiative crosslinking structure.

Samples A through D were each prepared by kneading starting materials at a compounding recipe shown in Table 1, and introducing sulfur-crosslinked structure into the elastomer by vulcanization at 145° C. for 40 minutes under pressure.

Rubber compositions each containing the thus internally crosslinked styrene, based thermoplastic elastomer and those which did not contain this type of elastomer were prepared as examples and comparative examples at compounding recipes shown Table 2, respectively, and coefficient of friction on ice and average domain diameter of the vulcanizates were measured. Braking performance and wearing performance of tires in which the thus obtained rubber composition was arranged in the tread were measured. Results are shown in Table 2.

TABLE 2(a)

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Compounding recipe | | | | | | | | | |
| Natural rubber | 100 | 100 | 100 | 100 | 60 | 100 | 100 | 100 | 100 |
| polybutadiene rubber | — | — | — | — | — | — | — | — | — |
| Carbon black | 40 | 40 | 40 | 40 | 40 | 40 | 40 | 40 | 40 |
| Internally crosslinked styrene based thermoplastic elastomer (kind) | 20 (B) | 20 (C) | 20 (D) | 20 (F) | 20 (B) | — | 20 (A) | 20 (E) | 20 (G) |
| Stearic acid | 1 | 1 | 1 | 1 | 1 | 1 | 1 | 1 | 1 |
| Antioxidant | 1 | 1 | 1 | 1 | 1 | 1 | 1 | 1 | 1 |
| Zinc oxide | 3 | 3 | 3 | 3 | 3 | 3 | 3 | 3 | 3 |
| Vulcanization accelerator CZ*1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 |

(part by weight)

TABLE 2(b)

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Properties of rubber composition | | | | | | | | | |
| Coefficient of friction on ice | 0.055 | 0.051 | 0.060 | 0.063 | 0.054 | 0.014 | 0.038 | 0.029 | 0.061 |
| Average domain diameter ($\mu$m) | 51 | 173 | 48 | 41 | 77 | — | 0.5 | 0.5 | 1241 |
| Tire performance | | | | | | | | | |
| Braking perform- | 125 | 121 | 132 | 135 | 120 | 100 | 104 | 103 | 131 |

(part by weight)

TABLE 2(b)-continued

|  | Example 1 | Example 2 | Example 3 | Example 4 | Example 5 | Comparative Example 1 | Comparative Example 2 | Comparative Example 3 | Comparative Example 4 (part by weight) |
|---|---|---|---|---|---|---|---|---|---|
| ance on ice |  |  |  |  |  |  |  |  |  |
| Wearing performance | 107 | 98 | 105 | 103 | 125 | 100 | 98 | 99 | 75 |

*[1]CZ: N-cyclohexyl-2-benzothiazylsulfenamide

As is clear from Table 2, the rubber composition in Examples 1 through 5 in which the average domain diameter of the styrene based thermoplastic elastomer was adjusted to a range of 1 to 1,000 μm by internal crosslinking had an improved coefficient of friction on ice as compared with the ordinary tread rubber composition given in Comparative Example 1. Thus, the tires using the rubber compositions in Examples 1 through 5 for the treads, respectively, had equal or better wearing performance and conspicuously improved braking performance on ice as compared with the tire using the composition in Comparative Example 1.

To the contrary, in the case of Comparative Examples 2 and 3 in which the internal crosslinking of the styrene based thermoplastic elastomer was not sufficient and the average domain diameter in the rubber composition was less than 1 μm, it is seen that the coefficient of friction on ice or braking performance on ice was not almost improved. In Comparative Example 4, it is seen that since the styrene based thermoplastic elastomer was internally crosslinked to an excessive extent, the average domain diameter in the rubber composition exceeded 1,000 μm so that the wear resistance was greatly lowered.

As is clear from the above-mentioned Examples and Comparative Examples, the pneumatic tire boxings, in the tread, a rubber composition in which the thermoplastic elastomer is internally crosslinked to exhibit the increase of 10% in tensile stress at the 100% elongation is blended into the rubber component composed mainly of the diene based rubber has improved driving performance braking performance and cornering stability on roads with ice and snow in a dry state or in a wet state without lowering the wear resistance.

The second aspect of the present invention will be explained below in more detail with reference to Examples and Comparative Examples.

Various structural factors and physical properties given in Examples and Comparative Examples were measured by the following methods.

(1) The weight ration between the vinyl aromatic hydrocarbon and the conjugated diene was determined by a proton NMR process.

(2) The content (%) of styrene in the polymer block composed mainly of the styrene polymer was calculated based on a chain distribution of styrene determined according to well known process (See Tanaka et al, Macromolecular Academy Resume, No. 29 (9), p 2055, 1980).

(3) The weight average molecular weight of the vinyl aromatic hydrocarbon based thermoplastic elastomer was determined as calculated as to polystyrene by preparing a tetrahydrofuran solution of a sample at a concentration of 0.1 g/100 ml and obtaining a molecular weight distribution curve by using a Water's GPC 200.

(4) The coefficient of friction on ice, braking performance on ice, and wearing performance were measured in the same manners as mentioned above. In the measurement of the coefficient of friction, the sample was obtained from a slab sheet produced by an ordinary vulcanization. In these tests, results are indicated by index by taking that of Comparative Example 5 as 100.

EXAMPLES 6-11 AND COMPARATIVE EXAMPLES 5-10:

The vinyl aromatic hydrocarbon based thermoplastic elastomers used were thermoplastic elastomers in which styrene and butadiene were used as the vinyl aromatic hydrocarbon and the conjugated diene, respectively, and their structural characteristics are shown in Table 3.

TABLE 3

| Thermoplastic elastomer | H | I | J | K | L | M |
|---|---|---|---|---|---|---|
| Block type | S-B*[1] | S-B | S-B | S-B | S-B | S-B-S |
| Styrene/butadiene (weight ratio) | 30/70 | 43/57 | 43/57 | 70/30 | 70/30 | 70/30 |
| Content of styrene in styrene segment (%) | 66 | 62 | 40 | 69 | 65 | 50 |
| Weight average molecular weight × $10^5$ | 1.5 | 1.6 | 1.3 | 1.5 | 0.8 | 1.5 |

*[1]In Table 3, S and b denote a styrene segment and a butadiene segment, respectively.

These thermoplastic elastomers were produced by using n-butyllithium as a catalyst in cyclohexane. The weight average molecular weight wa adjusted by varying the amount of n-butyllithium. The rate of styrene blocks was adjusted by varying the monomer ratio of styrene and butadiene in mixed monomers for the production of the B segments, that is, the polymer block composed mainly of the conjugated diene, while the mixed monomers were continuously fed into a polymerizing vessel.

Next, a rubber composition was prepared by blending the above thermoplastic elastomer into a rubber component at a recipe shown in Table 4. Coefficient of friction on ice of vulcanizates of the thus obtained rubber compositions were measured. Then, braking performance on ice and wearing resistance were measured with respect to tires in which the rubber composition was used in the tread. Results are shown in Table 4.

TABLE 4(a)

(parts by weight)

| | Comparative Example 5 | Comparative Example 6 | Comparative Example 7 | Comparative Example 8 | Example 6 | Example 7 | Example 8 | Example 9 | Example 10 | Example 11 | Comparative Example 9 | Comparative Example 10 |
|---|---|---|---|---|---|---|---|---|---|---|---|---|
| Natural rubber | 100 | 100 | 100 | 100 | 100 | 100 | 100 | 70 | 70 | 100 | 100 | 100 |
| Polybutadiene rubber | — | — | — | — | — | — | — | 30 | 30 | — | — | — |
| Carbon black (HAF) | 45 | 45 | 45 | 45 | 45 | 45 | 45 | 45 | 45 | 45 | 45 | 45 |
| Process oil | 10 | 10 | 10 | 10 | 10 | 10 | 10 | 10 | 10 | 10 | 10 | 10 |
| Thermoplastic elastomer (kind) | — | 20 (H) | 20 (J) | 20 (L) | 20 (I) | 20 (K) | 20 (L) | 20 (K) | 20 (I) | 50 (K) | 2 (K) | 90 (K) |
| Stearic acid | 2 | 2 | 2 | 2 | 2 | 2 | 2 | 2 | 2 | 2 | 2 | 2 |
| Antioxidant*1 | 1 | 1 | 1 | 1 | 1 | 1 | 1 | 1 | 1 | 1 | 1 | 1 |
| Zinc oxide | 3 | 3 | 3 | 3 | 3 | 3 | 3 | 3 | 3 | 3 | 3 | 3 |
| Vulcanization accelerator CZ*2 | 1 | 1 | 1 | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 | 1.5 | 1.5 | 1.5 |

TABLE 4(b)

(parts by weight)

| | Comparative Example 5 | Comparative Example 6 | Comparative Example 7 | Comparative Example 8 | Example 6 | Example 7 | Example 8 | Example 9 | Example 10 | Example 11 | Comparative Example 9 | Comparative Example 10 |
|---|---|---|---|---|---|---|---|---|---|---|---|---|
| Performances in indoor test | | | | | | | | | | | | |
| Coefficient of friction on ice | 0.011 | 0.012 | 0.018 | 0.015 | 0.041 | 0.052 | 0.049 | 0.057 | 0.045 | 0.050 | 0.011 | 0.038 |
| Tire performances | | | | | | | | | | | | |
| Braking performance on ice | 100 | 100 | 102 | 98 | 110 | 118 | 117 | 120 | 110 | 116 | 99 | 109 |
| Wearing performance | 100 | 94 | 91 | 82 | 106 | 105 | 107 | 109 | 113 | 105 | 93 | 89 |

*1Santoflex 13: N-(1,3-dimethyl-butyl)-N'-phenyl-p-phenylenediamine
*2CZ: N-cyclohexyl-2-benzothiazylsulfenamide In Comparative Example 5, no amount of the above-mentioned thermoplastic elastomer was used, and in each of Comparative Examples 6-9 and Examples 6-8, the thermoplastic elastomer shown in Table 3 was added to the same matrix rubber composition in an equal amount of 20 parts by weight. As shown in Table 4, as compared with the case which did not use this type of thermoplastic elastomer (Comparative Example 5), the cases with the thermoplastic elastomer B, D or F satisfying the requirements of the thermoplastic elastomer used in the present invention exhibited conspicuous effects with respect to the coefficient of friction measured on ice and tire braking performance on ice, while the wearing resistance was not adversely affected at all, but slightly improved. As is seen in Examples 9 and 10, the above-mentioned effects are exhibited even when the kinds of the rubber constituting the matrix portion was varied.

As seen from the comparison between Examples 7 and 11 and Comparative Examples 9 and 10, if the addition amount of the thermoplastic elastomer even satisfying the above-mentioned requirements is less than 5 parts by weight, sufficient braking performance on ice cannot be fully exhibited. On the other hand, if the addition amount is more than 80 parts by weight, the wearing resistance is conspicuously deteriorated to make practical application thereof impossible, although braking performance on ice is exhibited.

As is clear from Examples and Comparative Examples as mentioned above, the pneumatic tires using the rubber composition blended with a specific amount of the specific aromatic hydrocarbon based thermoplastic elastomer in the tread can greatly improve tire performances on ice and simultaneously assure the performances as tires in the summer season. Thus, the pneumatic tire according to the present invention can be truly practically applied as the all season type tires. Further, the tires can fully assure low fuel consumption. While the invention has been described in detail and with reference to specific embodiments thereof, it will be apparent to one skilled in the art that various changes and modifications can be made therein without departing from the spirit and scope thereof.

What is claimed is:

1. A pneumatic tire having a tread comprising a rubber composition,
    wherein said rubber composition is produced by blending a rubber component with a styrene based thermoplastic elastomer,
    said rubber component is composed essentially of a diene based rubber, and
    said elastomer is internally crosslinked so that tensile stress at 100% elongation is increased to 10 to 1,000% of the styrene based thermoplastic elastomer which is not internally crosslinked.

2. The pneumatic tire according to claim 1, wherein an average domain diameter of the styrene based thermoplastic elastomer is in a range of 1 to 1,000 μm.

3. The pneumatic tire according to claim 1, wherein the styrene based thermoplastic elastomer is blended in an amount of 1-50 parts by weight relative to 100 parts by weight of the rubber component.

4. A pneumatic tire having a tread portion comprising a rubber composition comprising a vinyl aromatic hydrocarbon thermoplastic elastomer blended with a rubber component in an amount of 5-80 parts by weight relative to 100 parts by weight of the rubber component, said vinyl aromatic hydrocarbon thermoplastic elastomer satisfying the following requirements:
  (1) the elastomer is a vinyl aromatic hydrocarbonconjugated diene based block type thermoplastic elastomer;
  (2) the elastomer has a weight ratio between a vinyl aromatic hydrocarbon and a conjugated diene as constituent monomer units thereof of 40/60 to 95/5;
  (3) the vinyl aromatic hydrocarbon in vinyl aromatic hydrocarbon based segments in the elastomer is not less than 50% by weight; and
  (4) a weight average molecular weight of the elastomer is not less than $1 \times 10^5$.

5. The pneumatic tire according to claim 4, wherein the vinyl aromatic hydrocarbon thermoplastic elastomer is at least one linear block copolymer selected from the group consisting of linear block copolymers having general formulae:

(1) $(A-B)_n$, (2) $A+B-A)_n$ and (3) $B+A-B)_{n+1}$ in which A and B are a copolymer block composed mainly of a vinyl aromatic hydrocarbon and a polymer block composed mainly of a conjugated diene, respectively, and n is an integer of one or more; in these formulae, no clear boundary may be seen between the polymer blocks A and B; the radial block copolymers have general formulae:

(4) $[(B-A)_{\overline{n}}]_{\overline{m+2}}X$, (5) $[(A-B)_{\overline{n}}]_{\overline{m+2}}X$, (6) $[(B-A)_nB]_{\overline{m+2}}X$ or (7) $[(A-B)_nA]_{\overline{m+2}}X$ in which, A and B have the same meanings as given above, X is a residual group of a coupling agent or a residual group of an initiating agent; and m and n are an integer of not less than 1.

6. The pneumatic tire according to claim 1, wherein the elastomer comprises at least one non-rubbery polymer block segment and at least one rubbery polymer block segment.

7. The pneumatic tire according to claim 6, wherein the at least one non-rubbery polymer block segment consists essentially of styrene.

8. The pneumatic tire according to claim 5, wherein n of general formula (1), (2) and (3) is an integer of 1 to 5.

9. The pneumatic tire according to claim 5, wherein m and n of general formulae (4), (5), (6) and (7) are an integer of 1 to 5.

10. The pneumatic tire according to claim 5, wherein the coupling agent is selected from the group consisting of silicon tetrachloride, tin tetrachloride, epoxidized soybean oil and an ester of a carboxylic acid.

11. The pneumatic tire according to claim 5, wherein the initiating agent is a polyfunctional organic lithium compound.

* * * * *